(12) United States Patent
Son et al.

(10) Patent No.: US 8,412,200 B2
(45) Date of Patent: Apr. 2, 2013

(54) HANDOVER METHOD IN A WIRELESS MOBILE COMMUNICATION SYSTEM AND A SYSTEM THEREFOR

(75) Inventors: Jung-Je Son, Seongnam-si (KR);
Pan-Yuh Joo, Seoul (KR); Hyoung-Kyu Lim, Seoul (KR); Sung-Jin Lee, Seoul (KR); Hyun-Jeong Kang, Seoul (KR); Jae-Hyuk Jang, Suwon-si (KR); Chung-Gu Kang, Seoul (KR); Jun-Hyuk Park, Seoul (KR); Tae-Young Min, Seoul (KR)

(73) Assignees: Samsung Electronics Co., Ltd., Suwon-si (KR); Korea University Industrial & Academic Collaboration Foundation, Seoul (KR)

( * ) Notice: Subject to any disclaimer, the term of this patent is extended or adjusted under 35 U.S.C. 154(b) by 1090 days.

(21) Appl. No.: 12/133,541

(22) Filed: Jun. 5, 2008

(65) Prior Publication Data
US 2008/0305798 A1     Dec. 11, 2008

(30) Foreign Application Priority Data
Jun. 5, 2007 (KR) .................. 10-2007-0055118

(51) Int. Cl.
*H04W 36/00* (2009.01)
(52) U.S. Cl. ......... 455/436; 455/437; 455/440; 455/411
(58) Field of Classification Search .......... 455/436–444, 455/410, 411
See application file for complete search history.

(56) References Cited

U.S. PATENT DOCUMENTS

| 7,440,757 | B2 | 10/2008 | Kwon et al. | |
| 7,519,368 | B2* | 4/2009 | Lim et al. | 455/436 |
| 7,620,020 | B2* | 11/2009 | Lim et al. | 370/335 |
| 7,724,706 | B2* | 5/2010 | Kang et al. | 370/331 |
| 2007/0238464 | A1* | 10/2007 | Lim et al. | 455/436 |
| 2008/0139205 | A1* | 6/2008 | Sayeedi | 455/436 |
| 2008/0146235 | A1 | 6/2008 | Kang et al. | |
| 2009/0186616 | A1* | 7/2009 | Kim et al. | 455/436 |

FOREIGN PATENT DOCUMENTS

| KR | 10-2005-0107253 A | 11/2005 |
| KR | 10-2006-0013886 A | 2/2006 |
| KR | 10-2006-0088072 A | 8/2006 |
| KR | 10-2008-0056921 A | 6/2008 |

* cited by examiner

*Primary Examiner* — Temica M Beamer
(74) *Attorney, Agent, or Firm* — Jefferson IP Law, LLP

(57) ABSTRACT

A handover method of a mobile station in a wireless mobile communication system and a system therefore are provided. The mobile station transmits a handover indication message to a serving base station, receives a ranging response message that comprises authentication information required for the mobile station to authenticate a target base station, receives fast ranging resources and transmits a ranging response acknowledgement (ACK) message, which comprises authentication information required for the target base station to authenticate the mobile station, to the target base station after receiving the fast ranging resources. Accordingly, a handover break time is minimized.

17 Claims, 4 Drawing Sheets

HANDOVER METHOD IN A WIRELESS MOBILE COMMUNICATION SYSTEM AND A SYSTEM THEREFOR

PRIORITY

This application claims the benefit under 35 U.S.C. §119 (a) of a Korean patent application filed with the Korean Intellectual Property Office on Jun. 5, 2007 and assigned Serial No. 2007-55118, the entire disclosure of which is hereby incorporated by reference.

JOINT RESEARCH AGREEMENT

The presently claimed invention was made by or on behalf of the below listed parties to a joint research agreement. The joint research agreement was in effect on or before the date the claimed invention was made and the claimed invention was made as a result of activities undertaken within the scope of the joint research agreement. The parties to the joint research agreement are 1) Samsung Electronics Co. Ltd. and 2) Korea University Industrial & Academic Collaboration Foundation.

BACKGROUND OF THE INVENTION

1. Field of the Invention

The present invention relates to a wireless mobile communication system. More particularly, the present invention relates to a handover method in a wireless mobile communication system and a system therefor.

2. Description of the Related Art

In general, a mobile station is provided service from a base station in a wireless mobile communication system. However, the base station has a limited service coverage area. Accordingly, if the mobile station moves out of the service coverage area of the base station from which it is receiving service, the mobile station must be handed over from the serving base station to a different base station. When the mobile station performs a handover, a handover break time occurs. The handover break time represents a time period, within the entire handover performance period, during which the mobile station cannot be provided with a service.

As the technology of the wireless mobile communication system is developed further, the users want to be provided with an improved quality of service. However, when the handover break time becomes longer, it is difficult for the users to be provided with the quality of service they desire. Therefore, it is necessary to develop a method which can provide the users with a better quality of service by minimizing the handover break time.

SUMMARY OF THE INVENTION

An aspect of the present invention is to address the above-mentioned problems and/or disadvantages and to provide at least the advantages described below. Accordingly, an aspect of the present invention is to provide a system and method for minimizing a service break time due to a handover of a mobile station in a wireless mobile communication system.

In accordance with an aspect of the present invention, a method for handover by a mobile station in a wireless mobile communication system is provided. The method includes transmitting a handover indication message to a serving base station, receiving a ranging response message that comprises authentication information required for the mobile station to authenticate a target base station, receiving fast ranging resources and transmitting a ranging response acknowledgement (ACK) message, which comprises authentication information required for the target base station to authenticate the mobile station, to the target base station after receiving the fast ranging resources.

In accordance with another aspect of the present invention, a method for supporting handover of a mobile station by a target base station in a wireless mobile communication system is provided. The method includes receiving a handover confirmation message, that indicates the mobile station to be handed over to the target base station, transmitting a ranging response message, that comprises authentication information required for the mobile station to authenticate the target base station, to the mobile station, allocating fast ranging resources to the mobile station and receiving a ranging response acknowledgement (ACK) message, that comprises authentication information required for the target base station to authenticate the mobile station, from the mobile station after allocating the fast ranging resources.

In accordance with still another aspect of the present invention, a wireless mobile communication system is provided. The system includes a mobile station, a serving base station which is providing a service to the mobile station and a target base station to which the mobile station is to be handed over, wherein the mobile station transmits a handover indication message comprising information about the target base station to the serving base station, receives a ranging response message comprising authentication information required for the mobile station to authenticate the target base station, from the target base station, receives fast ranging resources allocated by the target base station, and transmits a ranging response acknowledgement (ACK) message comprising authentication information required for the target base station to authenticate the mobile station, to the target base station.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, it should be noted that like reference numbers are used to depict the same or similar elements, features and structures.

DETAILED DESCRIPTION OF EXEMPLARY EMBODIMENTS

The following description with reference to the accompanying drawings is provided to assist in a comprehensive understanding of exemplary embodiment of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The present invention provides a handover system and method capable of minimizing a handover break time in a wireless mobile communication system.

According to exemplary embodiments of the present invention, a mobile station receives a ranging response (RNG-RSP) message from a target base station, without a request for ranging. Accordingly, the mobile station can resume communication from a time point when the mobile station has received a RNG-RSP message. Also, the mobile station performs authentication at the moment the mobile station starts communication with the target base station, so that an authentication procedure and a data communication resumption procedure, which are performed one by one in the conventional art, can be performed at the same time, thereby minimizing the handover break time.

Figure 1:
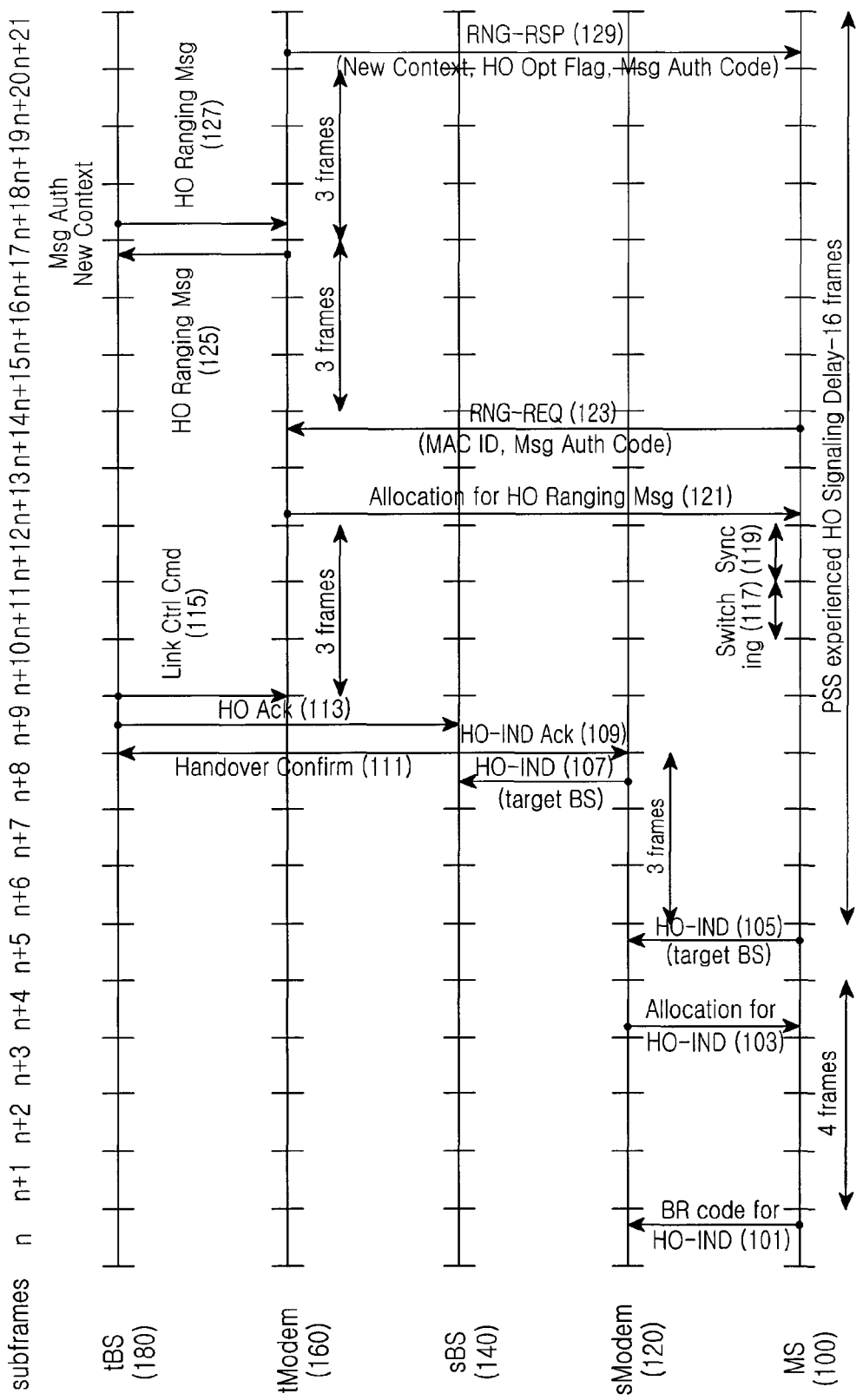
FIG. 1 is a time-based flow diagram illustrating a procedure in which a mobile station transmits/receives signals to/from a serving base station and a target base station in order to perform a handover according to an exemplary embodiment of the present invention.

FIG. 1 is a time-based flow diagram illustrating a procedure in which a mobile station transmits/receives signals to/from a serving base station and a target base station in order to perform a handover according to an exemplary embodiment of the present invention.

Referring to FIG. 1, at a time of sub-frame "n," a Mobile Station (MS) 100 transmits a bandwidth request (BR) message to a serving base station's modem (hereinafter, referred to as an "sModem") 120 in step 101. The BR message is a message that requests a bandwidth for transmission of a handover indication (HO-IND) message. Also, the serving Base Station (BS) is the BS from which the mobile station is currently being provided with a service.

At the time of frame "n+4," the sModem 120 allocates a bandwidth in step 103 so that the mobile station 100 can transmit a HO-IND message.

At the time of frame "n+5," the MS 100 transmits a HO-IND message, including information about a target BS (hereinafter, referred to as a "tBS") to which the mobile station 100 is to be handed over, to the sModem 120 in step 105.

At the time of frame "n+8," the sModem 120 transfers the HO-IND message to an upper layer 140 of the serving BS (hereinafter, referred to as a "sBS") in step 107. Thereafter, the sBS 140 transmits a response message (i.e. a HO-IND ACK message), representing that the sBS 140 has successfully received the HO-IND message, to the sModem 120 in step 109, and transmits a handover confirmation message to a tBS (hereinafter, referred to as a "tBS") 180 in step 111.

At the time of frame "n+9," the tBS 180 transmits a HO-ACK message to the sBS 140 in step 113. The HO-ACK message represents that the tBS 180 recognizes the MS 100 to be handed over to the tBS 180.

At the time of frame "n+10," the tBS 180 transmits a link control command to the tBS modem (hereinafter, referred to as a "tModem") 160 in step 115 so that the tModem 160 can reserve resources for the MS 100. The link control command is a command where the tBS 180 instructs the tModem 160 to reserve resources to be allocated to the MS after recognizing that the handover has been performed.

At the time of frame "n+13," the tModem 160 allocates resources to the MS 100 in step 121. The resources allocated to the MS 100 include those for a handover ranging message transmission by the MS 100. In this case, information about the allocated resources may be provided to the MS 100 using a fast ranging information element (IE).

Meanwhile, before receiving the allocated resources, the MS 100 performs a physical channel change from the sBS 120 to the tBS 180 at the time of frame "n+11" in step 117, and acquires synchronization with the tBS 180 at the time of frame "n+12" in step 119.

At the time of frame "n+14," the MS 100 transmits a ranging request (RNG-REQ) message to the tModem 160 in step 123. The MS 100 transmits the RNG-REQ message using the resources previously allocated by the tModem 160. The ranging request message includes a Medium Access Control IDentifier (MAC ID) of the MS 100 and an authentication code that is required for the tBS 180 to authenticate the MS 100.

At the time of frames "n+17" and "n+18," the tBS 180 and the tModem 160 transmit/receive a handover ranging message for authenticating the MS 100 in steps 125 and 127, respectively.

At the time of frame "n+21," the tModem 160 transmits a ranging response (RNG-RSP) message to the MS 100 in step 129. The RNG-RSP message includes an authentication code for authentication of the tBS, information (i.e. HO optimizing flag) representing a procedure which can be omitted after the ranging procedure, and information about a new context to be provided to the MS 100.

According to the first exemplary embodiment of the present invention, the MS 100 may be subjected to a handover break during a plurality of frames (e.g. during 16 frames), from a time point when the HO-IND message is transmitted, to a time point when a ranging response message is received. This is because authentication of the MS 100 is performed prior to all others in the procedure of exchanging a ranging request message and a ranging response message. Therefore, a second exemplary embodiment of the present invention will be described regarding a method in which a mobile station first receives a ranging response message including a Connection IDentifier (CID) from a base station and then transmits a ranging response acknowledgement message using the CID.

Figure 2:
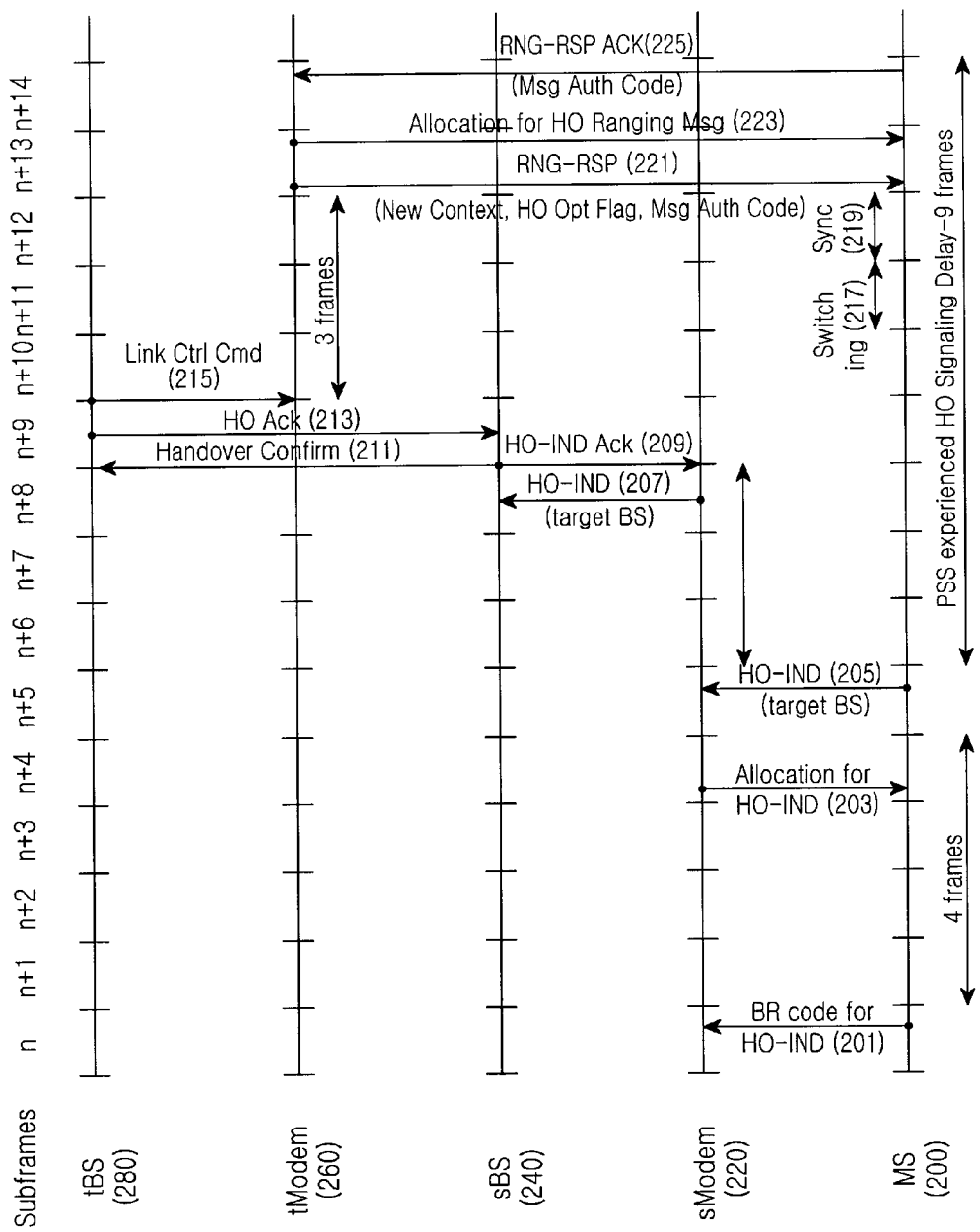
FIG. 2 is a time-based flow diagram illustrating a procedure in which a mobile station transmits/receives signals to/from a serving base station and a target base station in order to perform a handover according to an exemplary embodiment of the present invention.

FIG. 2 is a time-based flow diagram illustrating a procedure in which a mobile station transmits/receives signals to/from a serving base station and a target base station in order to perform a handover according to an exemplary embodiment of the present invention.

Referring to FIG. 2, steps 201 to 219 are substantially the same as steps 101 to 119 of FIG. 1, respectively. Therefore, a detailed description of steps 201 to 219 will be omitted merely for convenience.

In step 221, a tModem 260 transmits a ranging response message to the Mobile Station (MS) 200. The ranging response message includes information about authentication of the target Base Station (tBS), and information about a CID allocated to the MS. The MS 200 authenticates the tBS by using authentication information included in the ranging response message and reads information about the CID allocated to the MS 200.

Also, the tModem 260 allocates resources for a handover ranging message transmission of the MS 200 to the MS 200 in step 223. In this case, information about the allocated resources may be provided to the MS 200 using a fast ranging information information element (IE).

In step 225, the MS 200 transmits a ranging response acknowledgement (ACK) message to the tModem 260 in response to the ranging response message. The ranging response ACK message does not include information about an identifier of the MS 200, which is different from the ranging request message according to the previous exemplary embodiment of the present invention. That is, the ranging response ACK message according to the present exemplary embodiment of the present invention includes only authentication information of the MS 200.

Figure 3:
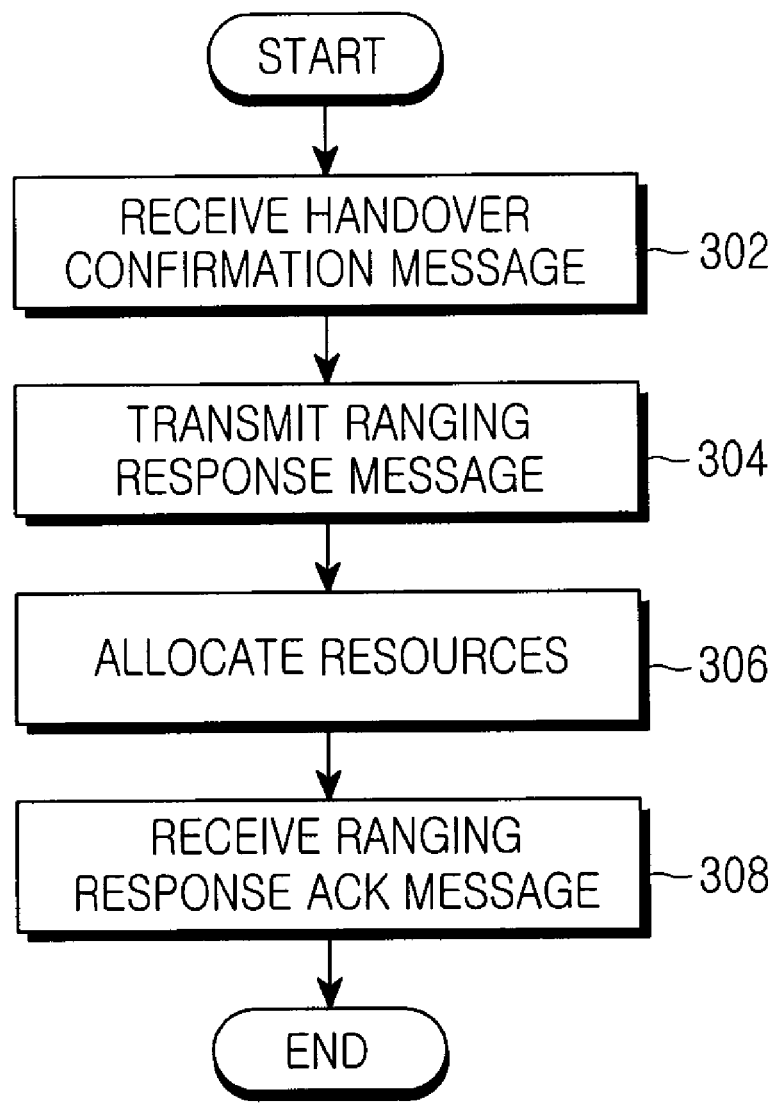
FIG. 3 is a flowchart illustrating a handover procedure performed by a target base station according to an exemplary embodiment of the present invention.

FIG. 3 is a flowchart illustrating a handover procedure performed by a target base station according to an exemplary embodiment of the present invention.

Referring to FIG. 3, the target Base Station (tBS) receives a handover confirmation message, informing that a Mobile Station (MS) is to be handed over to the tBS, from a serving Base Station (sBS) in step 302. In step 304, the tBS transmits a ranging response message to the MS. In step 306, the tBS allocates ranging resources for the MS to the MS, and then proceeds to step 308. In step 308, the tBS receives a ranging response acknowledgement (ACK) message from the MS. In this exemplary implementation, the ranging response ACK message includes an authentication code required for authentication of the MS.

Figure 4:
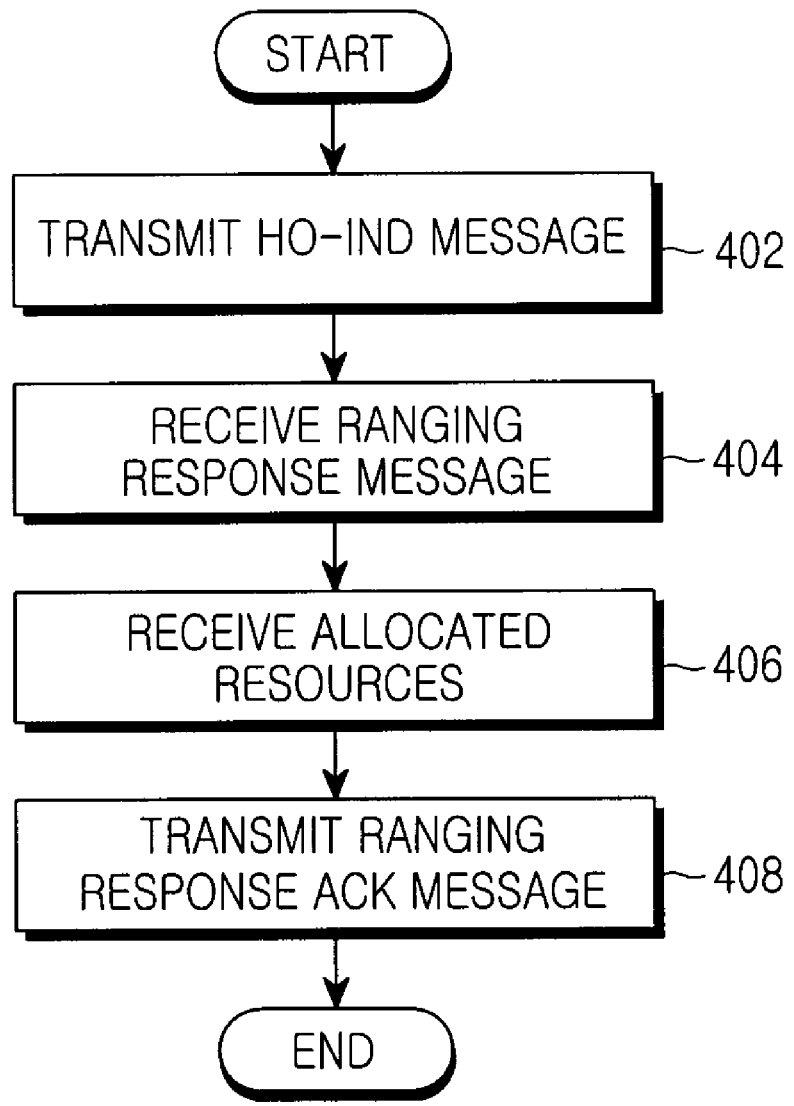
FIG. 4 is a flowchart illustrating a handover procedure performed by a mobile station according to an exemplary embodiment of the present invention.

FIG. 4 is a flowchart illustrating a handover procedure performed by a mobile station according to an exemplary embodiment of the present invention.

Referring to FIG. 4, the Mobile Station (MS) transmits a handover indication (HO-IND) message, including information about a target Base Station (tBS) to which the MS is to be handed over, to a serving Base Station (BS) in step 402. In step 404, the MS receives a ranging response message from the tBS, and then proceeds to step 406. In step 406, the MS is allocated resources for transmission of a ranging response acknowledgement (ACK) message, from the tBS. In step 408, the MS transmits a ranging response ACK message, including an authentication code for authentication of the MS, to the tBS.

As described above, the system and method, according to exemplary embodiments of the present invention, enhance a handover procedure in a wireless mobile communication system, thereby minimizing a service break time due to a handover of a mobile station.

While the present invention has been shown and described with reference to certain exemplary embodiments thereof, it will be understood by those skilled in the art that various changes in form and details may be made therein without departing from the spirit and scope of the invention as defined by the appended claims. Accordingly, the scope of the invention is not to be limited by the above embodiments but by the claims and the equivalents thereof.

What is claimed is:

1. A method for handover by a mobile station in a wireless mobile communication system, the method comprising:
   transmitting a handover indication message to a serving base station;
   receiving, from a target base station, a ranging response message that comprises authentication information required for the mobile station to authenticate the target base station;
   being allocated fast ranging resources; and
   transmitting a ranging response acknowledgement (ACK) message, which comprises authentication information required for the target base station to authenticate the mobile station, to the target base station after being allocated the fast ranging resources.

2. The method as claimed in claim 1, wherein the transmitting of the handover indication message comprises transmitting a message including information about the target base station to which the handover is to be performed.

3. The method as claimed in claim 2, wherein the ranging response message is received after transmitting the handover indication message.

4. The method as claimed in claim 3, wherein the fast ranging resources are allocated by the target base station.

5. The method as claimed in claim 4, wherein the fast ranging resources are received after the receiving of the ranging response message.

6. The method as claimed in claim 1, wherein the ranging response message comprises an authentication code as information for authentication of the target base station.

7. The method as claimed in claim 1, wherein the ranging response ACK message comprises an authentication code as information for authentication of the mobile station.

8. A method for supporting handover of a mobile station by a target base station in a wireless mobile communication system, the method comprising:
   receiving a handover confirmation message that indicates the mobile station to be handed over to the target base station;
   transmitting a ranging response message, that comprises authentication information required for the mobile station to authenticate the target base station, to the mobile station;
   allocating fast ranging resources to the mobile station; and
   receiving a ranging response acknowledgement (ACK) message, that comprises authentication information required for the target base station to authenticate the mobile station, from the mobile station after allocating the fast ranging resources.

9. The method as claimed in claim 8, wherein the handover confirmation message is received from a serving base station which is performing a service to the mobile station.

10. The method as claimed in claim 9, wherein the ranging response message is transmitted after receiving the handover confirmation message.

11. The method as claimed in claim 10, wherein the fast ranging resources are allocated to the mobile station after the ranging response message is transmitted.

12. The method as claimed in claim 8, wherein the ranging response message comprises an authentication code as information for authentication of the target base station.

13. The method as claimed in claim 8, wherein the ranging response ACK message comprises an authentication code as information for authentication of the mobile station.

14. A wireless mobile communication system comprising:
   a mobile station;
   a serving base station which is providing a service to the mobile station; and
   a target base station to which the mobile station is to be handed over,
   wherein the mobile station transmits a handover indication message comprising information about the target base station to the serving base station, receives a ranging response message comprising authentication information required for the mobile station to authenticate the target base station from the target base station, being allocated fast ranging resources from the target base station, and transmits a ranging response acknowledgement (ACK) message comprising authentication information required for the target base station to authenticate the mobile station to the target base station.

15. The system as claimed in claim 14, wherein the ranging response message comprises information for authentication of the target base station.

16. The system as claimed in claim 14, wherein the ranging response ACK message comprises information for authentication of the mobile station.

17. The system as claimed in claim 14, wherein the target base station receives a handover confirmation message that indicates the mobile station to be handed over to the target base station from the serving base station, transmits the ranging response message that comprises authentication information required for the mobile station to authenticate the target base station to the mobile station, allocates the fast ranging resources to the mobile station, and receives the ranging response ACK message that comprises authentication information required for the target base station to authenticate the mobile station from the mobile station.

* * * * *